May 4, 1926.

B. D. CHAMBERLIN 1,583,655

MOTION PICTURE APPARATUS

Filed June 12, 1923    3 Sheets-Sheet 1

INVENTOR
Benjamin D. Chamberlin
BY
ATTORNEYS.

May 4, 1926.
B. D. CHAMBERLIN
MOTION PICTURE APPARATUS
Filed June 12, 1923
1,583,655
3 Sheets-Sheet 2
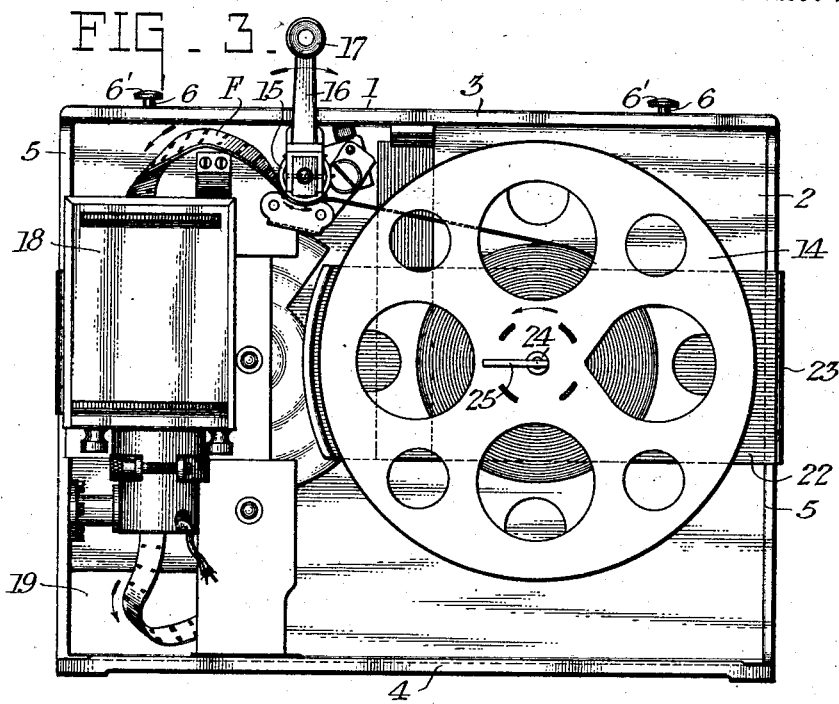
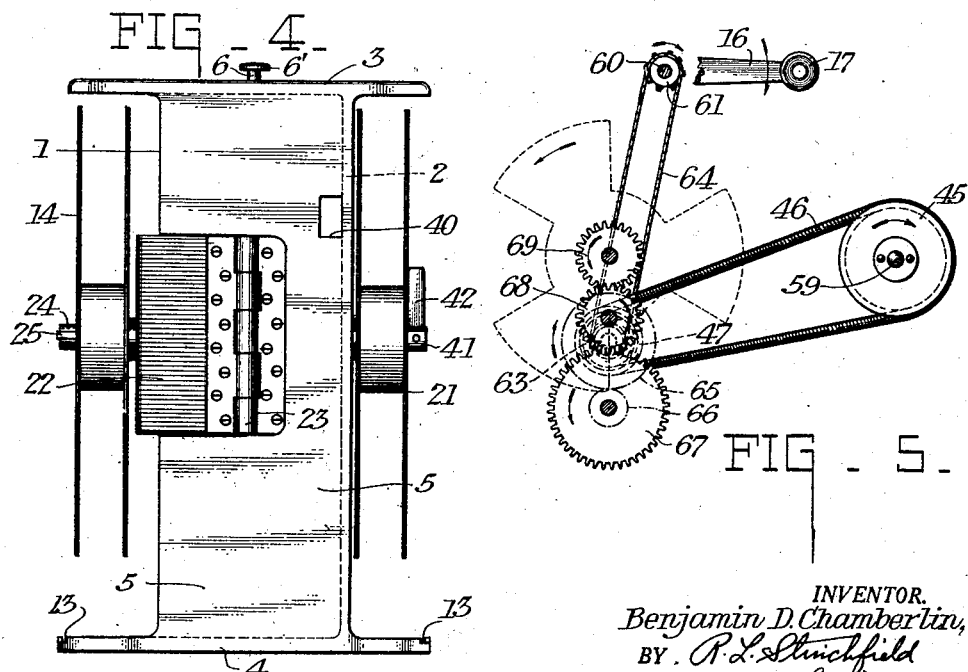
INVENTOR.
Benjamin D. Chamberlin,
BY
ATTORNEYS.

May 4, 1926.
B. D. CHAMBERLIN
1,583,655
MOTION PICTURE APPARATUS
Filed June 12, 1923
3 Sheets-Sheet 3
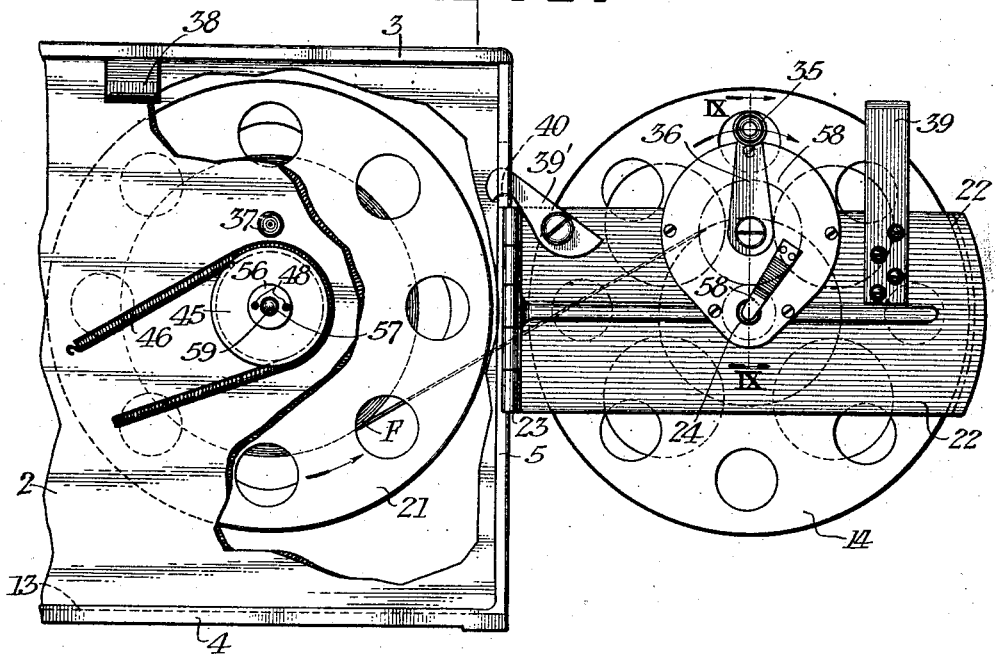
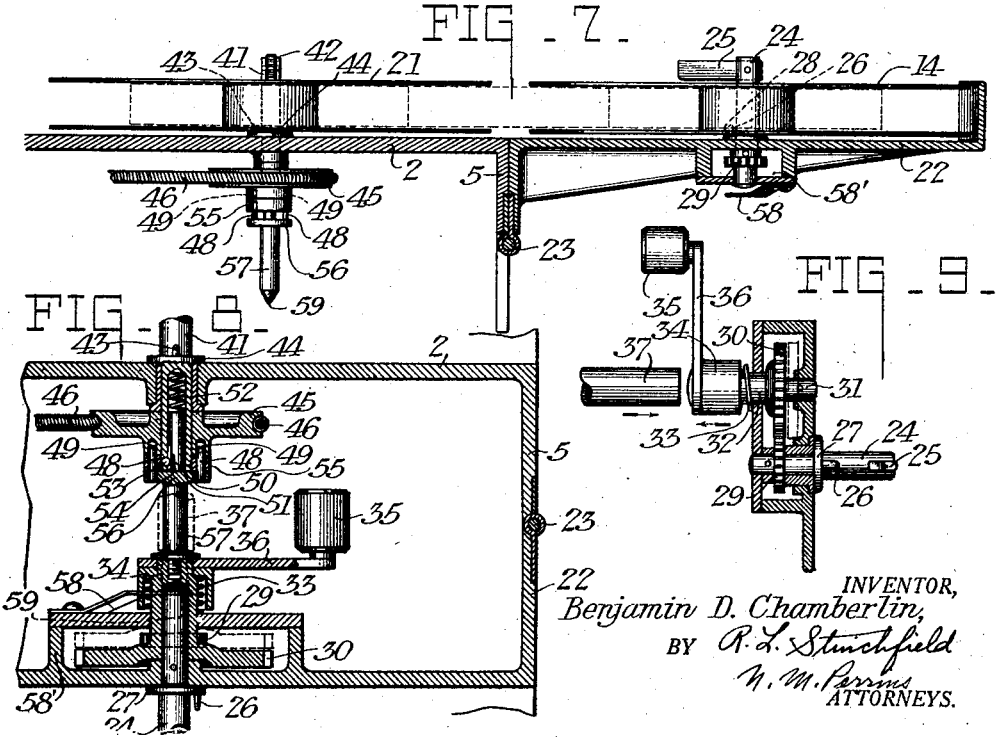
INVENTOR,
Benjamin D. Chamberlin,
BY R. L. Stinchfield
N. M. Perrins
ATTORNEYS.

Patented May 4, 1926.

1,583,655

UNITED STATES PATENT OFFICE.

BENJAMIN DAY CHAMBERLIN, OF ROCHESTER, NEW YORK, ASSIGNOR TO EASTMAN KODAK COMPANY, OF ROCHESTER, NEW YORK, A CORPORATION OF NEW YORK.

MOTION-PICTURE APPARATUS.

Application filed June 12, 1923. Serial No. 644,989.

*To all whom it may concern:*

Be it known that I, BENJAMIN D. CHAMBERLIN, a citizen of the United States of America, residing at Rochester, in the county of Monroe and State of New York, have invented certain new and useful Improvements in Motion-Picture Apparatus, of which the following is a full, clear, and exact specification.

This invention relates to a motion picture projector and particularly to such an apparatus of a simple and portable type, the main object of the invention being to provide a compact structure that may be used in the home, that is easy to operate, and practical to manufacture. Particular provision is made for the ready rewinding of the film after use. For this purpose the supply reel is swung to a position to the rear of the take-up reel, and the drive for the take-up is thereby automatically rendered inoperative while the rewinding handle is automatically rendered operative.

Other objects and advantages will appear in the specification following and the novel features will be more particularly defined in the claims.

In the drawings, wherein like reference characters denote like parts throughout:

Fig. 3 is a similar view of the opposite side;

Fig. 4 is an end elevation thereof;

Fig. 5 is a portion of the drawing mechanism removed from the projector;

Fig. 6 is a fragmentary side elevation of the projector in rewinding position;

Fig. 7 is a fragmentary sectional view of certain parts of the projector in rewinding position;

Fig. 8 is a similar view of certain parts in projecting position, and

Fig. 9 is a detail section on line IX—IX of Fig. 6.

Figure 1:
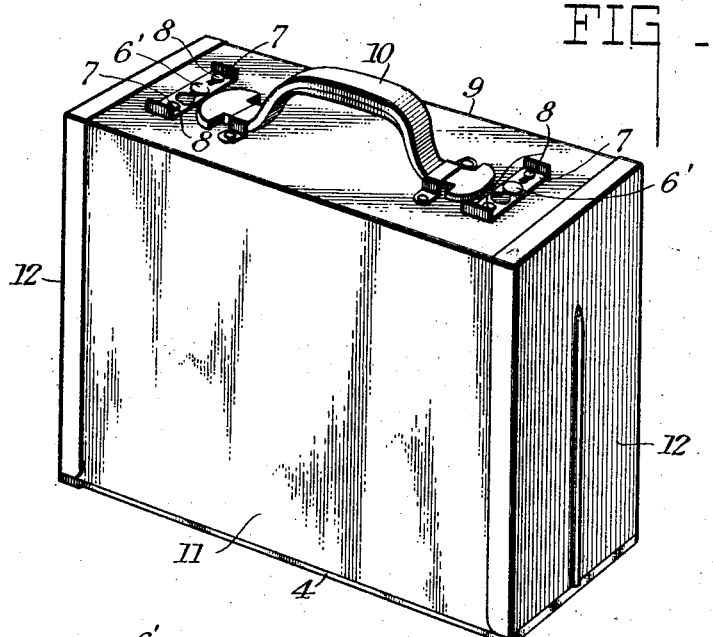
Fig. 1 is a perspective of a projector and case constructed in accordance with and illustrating one form of my invention.

I prefer to make my projector of a main frame 1 having an upright central frame 2, top 3, bottom 4, and ends 5. The top 3 has two studs 6, the enlarged heads 6' of which are engaged by the latches 7 carried upon studs 8 of a removable cover 9. A handle 10 is provided for carrying the machine. The cover 9 consists of sides 11, and ends 12, the former preferably engaging slots 13 in the bottom 4 of the main frame 1. The cover fits over and encloses the whole mechanism, its lower edges resting on bottom 4.

Figure 2:
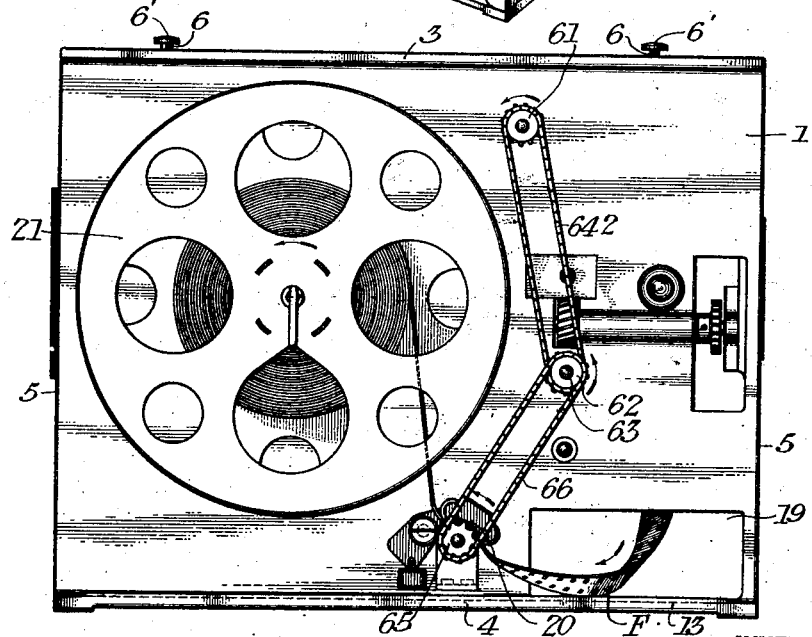
Fig. 2 is a side elevation of the machine with the cover removed.

The film F is drawn from a supply reel 14 over sprocket 15, which is driven by crank 16 and handle 17. It is then turned into a plane perpendicular to its former position and drawn down past the lamphouse 18 by a suitable pull down mechanism, not shown, past the usual projection gate, and then through an opening 19 in panel 2 (Fig. 3). It is then turned through another loop to a plane perpendicular to the gate and drawn over a sprocket 20 (Fig. 2) from which it is drawn upon a take-up reel 21.

For rewinding, reel 14 is swung upon its supporting arm 22 hinged at 23 to the main frame end 5 into a position in the rear of and in line with reel 21, (Fig. 7).

Reel 14, is carried by a shaft 24, being held thereon by the usual latch 25. This shaft, which runs free during projection, is connected to the reel 14 by pin 26 on flange 27 affixed to the shaft and engaging an aperture 28 of the reel. A gear 29 is pinned to shaft 24. This gear may mesh with a second gear 30 revolubly supported upon a fixed shaft 31 but carried by a sleeve shaft 32 movable axially of shaft 31. A spring 33 normally tends, by pressing upon the cap 34, to press the large gear 30 into position shown in full lines, Fig. 9, when shaft 24 may be rotated by handle 35 through the crank 36 carried by cap 34. In this position reel 14 may be driven to rewind film when the parts are in the position shown in Figs. 6 and 7. When the apparatus, as in Fig. 8, is in condition for projecting, a shaft 37 fixed on wall 2 strikes the cap 34, moving it and the shaft 32 inwardly against the action of spring 33, thus moving gear 30 from mesh with gear 29. This movement of gear 30 is from the dashed to the full line position, Fig. 8. Gear 29 then revolves idly as the machine projects pictures, and, by releasing latch 38 which retains support 22 through arm 39 closed, and swinging support 22 to the winding position gear 30 is automatically brought into mesh with 29. A latch 39' retains support 22 in rewinding position through engagement with aperture 40 of end 5.

During projection, reel 21 must be frictionally driven, and when rewinding this reel must run freely. A shaft 41 with latch 42 supports reel 21. The driving pin 43 carried by flange 44 of shaft 41 engages the aperture of the reel. Shaft 41 may be driven through hollow shaft 50, rigid therewith, a pulley 45, slip belt 46, and driving pulley 47. Referring to Fig. 8, pulley 45 is shown in position to drive reel 21. Pulley 45 is mounted to turn freely upon hollow shaft 50 inside of which is a shaft 51 thrust outwardly by spring 52, the axial movement being limited by pin 53 and the flat surface 54 on shaft 50. Rigid with shaft 50 is a clutch disc 55 having inwardly extending pins 48, which slidingly engage corresponding apertures in disc 55 carried by hollow shaft 50. When in the position shown in Fig. 8, these pins engage apertures 49 in pulley 45. Extending outwardly from the clutch disc 55 is an extension shaft 57, the end 59 of which is engaged by the strong spring 58 when the reel 14 and its carrier 22 are swung into projection position. Since spring 58 is stronger than spring 52, it forces extension 57 and hence clutch pins 48 inwardly and establishes a driving relation between pulley 45 and reel 21. When, however, arm 22 is swung upon hinge 23 to rewinding position, spring 58, carried by casing 58', will release shaft 57 and spring 52 will force outwardly parts 51, 55 and 57. Pins 48 will be withdrawn from apertures 49, releasing pulley 45 so that it may run idly. Thus the reel is automatically disengaged for rewinding and engaged for winding through the positioning of reel 14.

In case clutch pins 48 do not mesh when arm 22 is swung into projecting position, spring 58 will thrust in upon shaft 57 until the necessary portion of a turn of pulley 45 brings apertures 49 into the proper position when the pins will engage the pulley and drive reel 21.

The following drive is used with the above mechanism. Handle 17 drives crank 16 and with it shaft 60 upon which sprocket 15 is affixed. A sprocket 61 (Fig. 2) is also carried by this shaft, moving sprocket 62 and shaft 63 by chain 64. A second sprocket on shaft 63 drives sprocket 65 through chain 66, thus moving the film sprocket 20. Shaft 63, (Fig. 5) drives the shutter 64 through gears 65, 66, 67, 68, and 69, and in addition drives pulley 47 connected to pulley 45 by the spring belt 46.

As the pull down mechanism forms no part of my present invention, it will not be herein described.

The operation of the projector is readily apparent from the above description. A full reel 14 is placed on the shaft 24, in the position coaxial with the take-up reel. The lead end of the film F is threaded through the mechanism and attached to the take-up reel 21 on shaft 41. In this position of reel 14 and its support the clutch is operative to connect the operating handle 17 to the take-up reel, and the reel 14 turns idly. The handle is turned and the film passes through the projector and is wound on the take-up reel. The support 22 is then swung on its hinge 23 to the position shown in Figs. 6 and 7, thus simultaneously rendering the clutch inoperative and rendering the connection between the rewind handle 35 and the supply reel operative. The rear end of the film is then attached to the reel 14, now empty, and rewound thereon, the reel 21 turning idly.

It is to be understood that the above described embodiment is illustrative of the principles of my invention and that numerous equivalents and modifications are possible, and I consider as within the scope of my invention all of these that are included within the following claims.

Having thus described my invention, what I claim as new and desire to secure by Letters Patent is:

1. Apparatus of the type described comprising means for supporting a reel in a definite position, means for turning such reel to wind a strip of material thereon, a support for a second reel having two positions relative to said definite position, and means automatically rendering inoperative the turning means for the first reel when the second reel support is in one of its positions.

2. In a motion picture apparatus, film advancing mechanism, a support in a fixed position for a first reel, means to turn said reel to wind up film from the film advancing mechanism, a support for a second reel having a first position at which film may be drawn therefrom to the film advancing mechanism, and having a second position at which a reel thereon will be in alignment with the first reel for rewinding.

3. In motion picture apparatus, film-advancing mechanism, a support for a first reel having a definite position, means to turn said reel to wind up film from the film-advancing mechanism, a support for a second reel having a first position relative to said definite position, at which a reel thereon will be out of alignment with a reel on the first support and at which film may be drawn therefrom to the film-advancing mechanism, and having a second position relative to said definite position at which a reel thereon will be in alignment with the first reel for rewinding.

4. In motion picture apparatus, film advancing mechanism, a support for a first reel having a definite position, means to turn said reel to wind up film from the film advancing mechanism, a support for a second reel having a first position relative to said definite position and at which film may be drawn therefrom to the film advancing mechanism, and having a second position relative to said definite position and at which a reel thereon will be in alignment with the first reel for rewinding, a handle for turning said second reel and means for automatically rendering said handle inoperative when the second reel is in its first position.

5. In motion picture apparatus, film advancing mechanism, a support for a first reel having a definite position, means to turn said reel to wind up film from the film advancing mechanism, a support for a second reel having a first position relative to said definite position and at which film may be drawn therefrom to the film advancing mechanism, and having a second position relative to said definite position and at which a reel thereon will be in alignment with the first reel for rewinding, a handle for turning said second reel and means for automatically rendering said handle inoperative when the second reel is in its first position, and means for automatically rendering the turning means for the first reel inoperative when the second reel is in its second position.

6. In motion picture apparatus, film advancing mechanism, a support for a first reel having a definite position, means to turn said reel to wind up film from the film advancing mechanism, a support for a second reel having a first position relative to said definite position and at which film may be drawn therefrom to the film advancing mechanism, and having a second position relative to said definite position and at which a reel thereon will be in alignment with the first reel for rewinding, and means for automatically rendering the turning means for the first reel inoperative when the second reel is in its second position.

7. In motion picture apparatus, a first reel support in fixed position, an operating drive, connections between said drive and said support including a clutch, a second reel support having a first position relative to the first mentioned support and at which film may be drawn from a reel thereon to a reel on the first support, and having a second position relative to the first mentioned support and, the clutch being operative to establish a driving connection between the drive and a reel on the first support when the second reel support is in it first position and being automatically rendered inoperative when the second reel support is removed from its first position.

8. In motion picture apparatus, a first reel support having a definite position, an operating drive, connections between said drive and said support including a clutch, a second reel support having a first position relative to said definite position and at which film may be drawn from a reel thereon to a reel on the first support, and having a second position relative to said definite position and at which film may be rewound from a reel on the first support to a reel on the second support, a rewind drive for a reel on the second support, and simultaneously operative mechanisms for automatically rendering the clutch operative and the rewind drive inoperative when the second support is in its first position and for rendering the clutch inoperative and the rewind drive operative when the second support is removed from its first position.

9. In motion picture apparatus, a first reel support having a definite support, an operating drive, connections between said drive and said support including a clutch, a second reel support having a first position relative to said definite position and at which film may be drawn from a reel thereon to a reel on the first support, and having a second position relative to said definite position and at which film may be rewound from a reel on the first support to a reel on the second support, a rewind drive for a reel on the second support, and simultaneously operative mechanisms for automatically rendering the clutch operative and the rewind drive inoperative when the second support is in its first position and for rendering the clutch inoperative and the rewind drive operative when the second support is in its second position.

10. In a motion picture projector, a first reel support, a second reel support having a position coaxial to the first reel support, means for feeding film from a reel on said second support at said position to a reel on the first support, said second support being movable to a second position in longitudinal alignment with said first reel support, whereby film may be rewound from a reel on said first support to a reel on the second support.

11. In a motion picture projector, a first reel support, a second reel support having a position coaxial to the first reel support, driving means for a reel on said first support, said second reel support being movable to a second position in longitudinal alignment with said first reel support, means for turning a reel on said second support, and mechanisms for rendering said driving means inoperative when the second support is in its second position and for rendering said turning means inoperative when the second support is in its first position.

Signed at Rochester, N. Y., this 6th day of June, 1923.

BENJAMIN DAY CHAMBERLIN.